United States Patent [19]
Haeuszer

[11] 3,965,471
[45] June 22, 1976

[54] RADIATION DETECTION SYSTEM

[75] Inventor: Floyd A. Haeuszer, Cannon Falls, Minn.

[73] Assignee: The United States of America as represented by the Secretary of the Air Force, Washington, D.C.

[22] Filed: Aug. 13, 1969

[21] Appl. No.: 851,151

[52] U.S. Cl. .............................. 343/18 E; 307/234; 307/265
[51] Int. Cl.² .......................................... G01S 7/36
[58] Field of Search .......... 343/18 E; 307/265, 267, 307/234; 328/59, 66, 61

[56] References Cited
UNITED STATES PATENTS
3,125,691   3/1964   Astheimer ...................... 307/267 X

*Primary Examiner*—T.H. Tubbesing
*Attorney, Agent, or Firm*—Joseph E. Rusz; Willard R. Matthews, Jr.

[57] ABSTRACT

A circuit is disclosed that detects radiation transients and provides a clamping signal in response to each transient. The clamping signal is present from the time the transient rises above a given threshold level and for a known duration thereafter. The system includes radiation sensors, a blocking oscillator that generates a pulse in response to each sensor signal, and an output pulse duration control circuit. The oscillator pulses are fed simultaneously to the output pulse duration control circuit and to an OR gate, the output of which comprises the system output. The output pulse duration is controlled by the time required to magnetize a magnetic core to saturation in first one direction and then the other.

2 Claims, 9 Drawing Figures

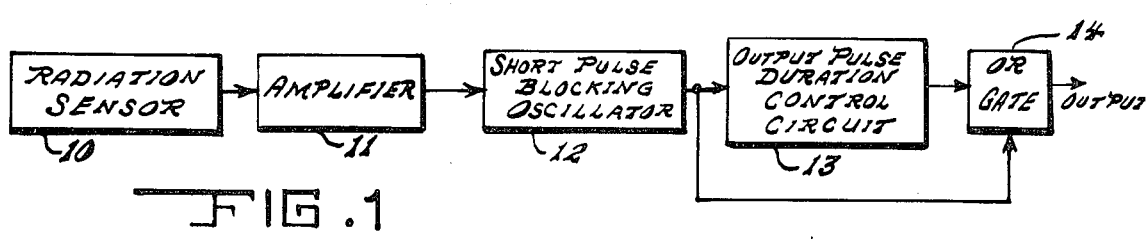
FIG. 1
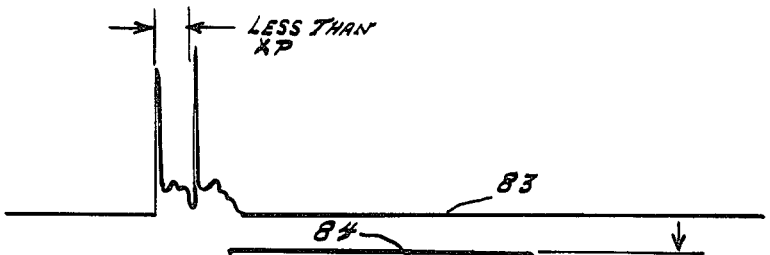
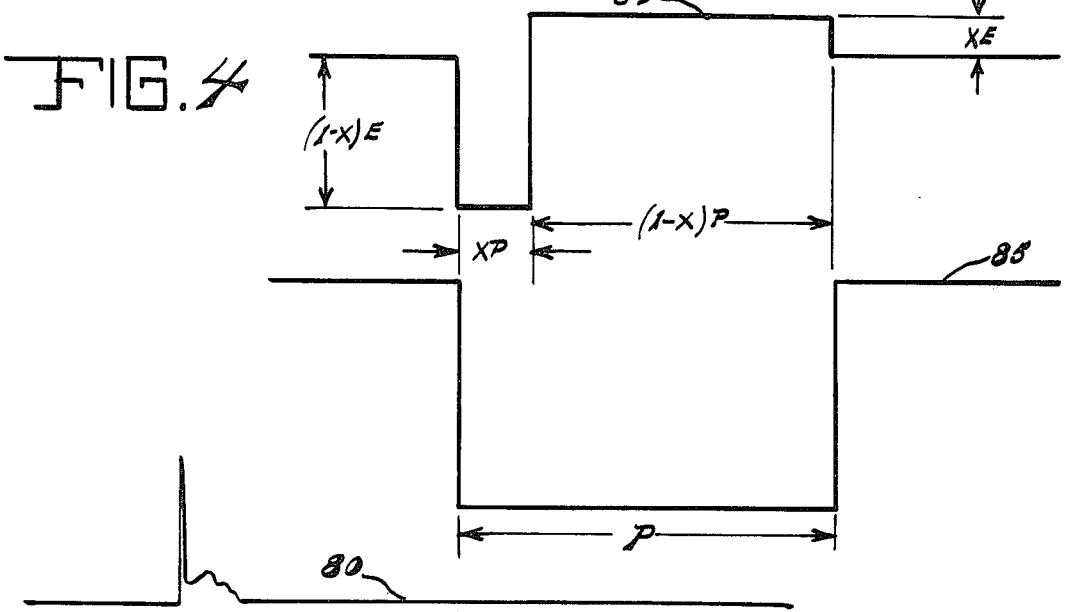
FIG. 4
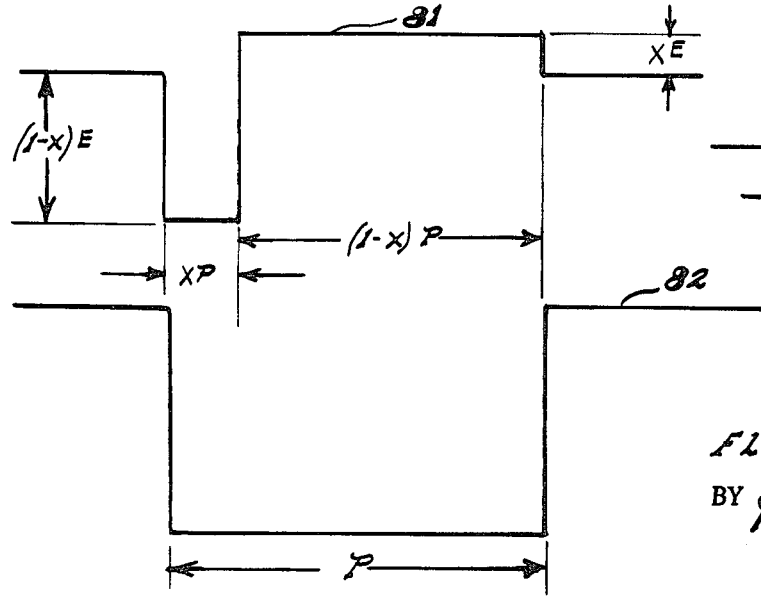
FIG. 3
INVENTOR.
FLOYD A. HAEUSZER

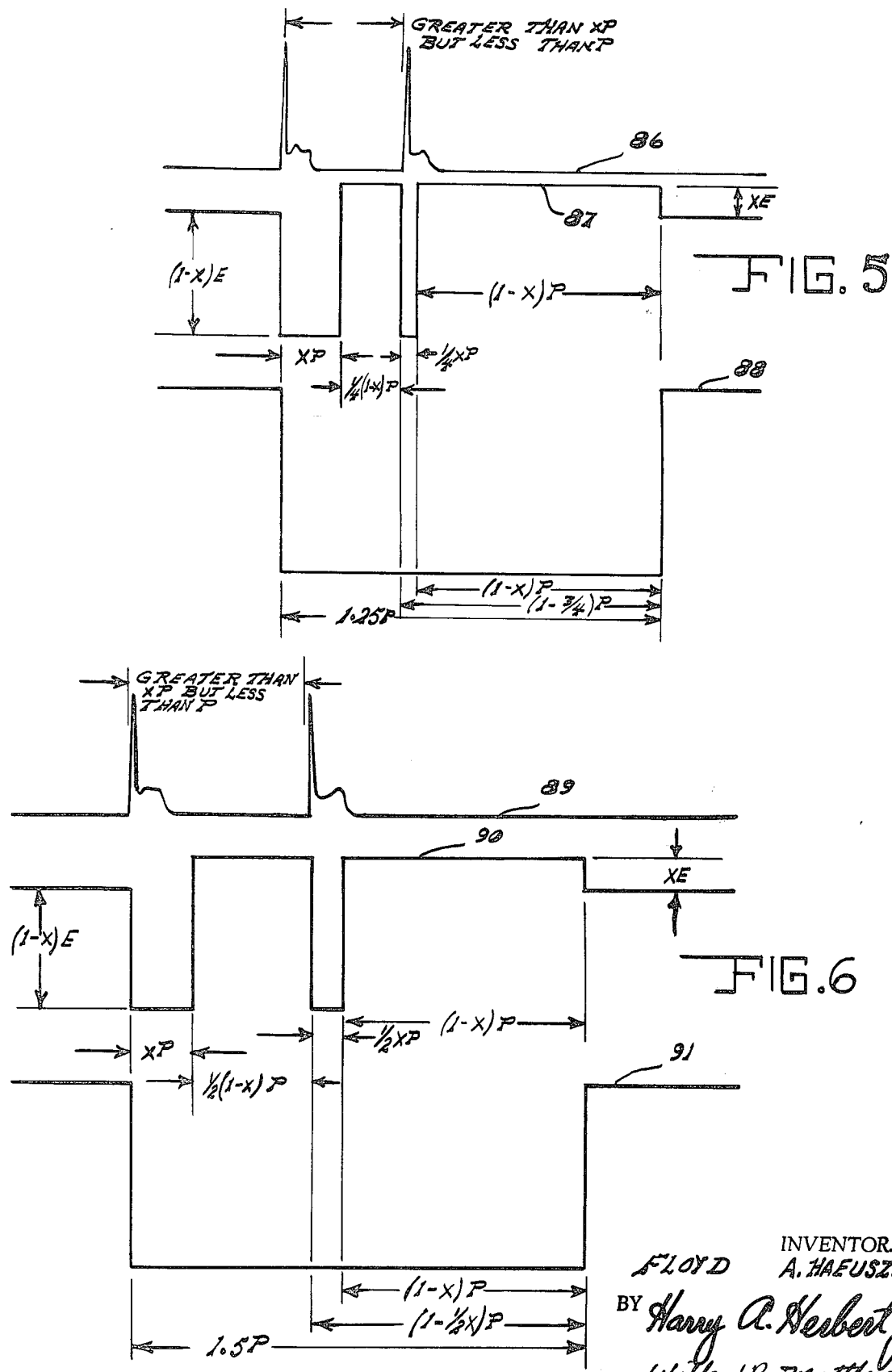

3,965,471

RADIATION DETECTION SYSTEM

BACKGROUND OF THE INVENTION

This invention relates to radar systems employing circumvention techniques, and in particular to a radiation detection system and subsystem capable of delivering clamping signals as required in circumvention circuits.

The detection of radiation transients and the implementation of appropriate electronic circuits in response to the presence of such radiation transients constitute important functions in many radar systems. This is particularly true when so-called circumvention techniques are employed. In such a situation it is required that a clamping signal be provided that is present for a fixed, accurately controlled duration following each radiation transient regardless of the number of transients or of the time spacing between any group of transients. No circuits capable of accomplishing this are currently available and the state of the art does not indicate any possible solution to the problem of providing such clamping signals.

SUMMARY OF THE INVENTION

The present invention comprehends a circumvention subsystem which delivers a clamping signal of known duration following each detected radiation transient. This is accomplished by a magnetic core magnetizing sequence that takes a given length of time and that is initiated in each instance by a blocking oscillator pulse. Blocking oscillator pulses are generated in response to each detected radiation transient that exceeds a given threshold level. The output of the system is an OR gate which delivers an output in response to the blocking oscillator pulses or during the magnetic core magnetizing sequence.

It is the principal object of the invention to provide a subsystem for use in conjunction with a circumvention circuit adapted to deliver a clamping signal of given duration in response to certain radiation transients regardless of the number of transients or the spacing between any group of them.

Other objects, features and advantages of the invention will become more apparent from the following detailed description taken in conjunction with the illustrative embodiment in the accompanying drawings.

DESCRIPTION OF THE DRAWINGS

FIG. 1 is a block diagram of the preferred embodiment of the invention;

FIG. 3 illustrates pulses generated in response to a single radiation transient;

FIG. 4 illustrates pulses generated in response to two radiation transients that are spaced less than the output pulse duration control circuit set time;

FIG. 5 illustrates pulses generated in response to two radiation transients that are spaced at more than the output pulse duration control circuit set time and less than the output pulse period;

FIG. 6 illustrates a second instance of pulses generated in response to two radiation transients that are spaced at more than the output pulse duration control circuit set time and less than the output pulse period;

DESCRIPTION OF THE PREFERRED EMBODIMENT

Figure 2:
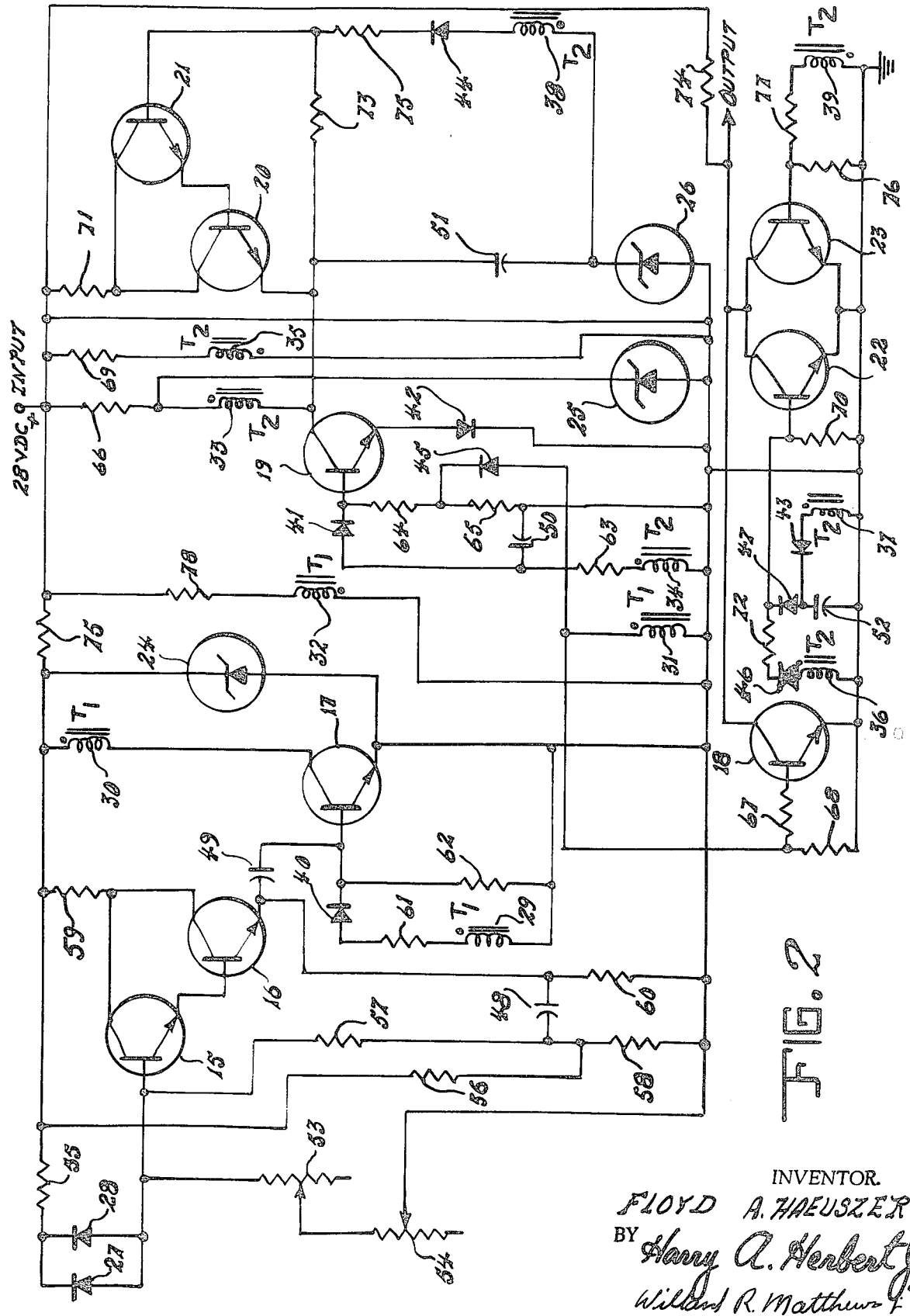
FIG. 2 is a schematic diagram of the embodiment of FIG. 1.

The radiation detector system of the present invention as illustrated by the block diagram of FIG. 1 comprises radiation sensor means 10, amplifier 11, short pulse blocking oscillator 12, output pulse duration control circuit 13 and OR gate 14. In operation, radiation above a predetermined threshold level is detected by radiation sensor 10. The output of radiation sensor 10 is applied to and amplified by amplifier 11. The output of amplifier 11 is applied to short pulse blocking oscillator 12 which provides in response to each amplified radiation sensor output pulse a fast leading edge to the output through OR gate 14 and simultaneously delivers an actuating pulse to output pulse duration control circuit 13. The output of output pulse duration control circuit 13 is a known duration signal that is applied to various subsystems through OR gate 14.

FIG. 2 is a schematic diagram of the radiation detection system of FIG. 1. Radiation sensor means 10 consists of diodes 27 and 28, resistor 55 and variable resistors 53 and 54. Amplifier 11 consists of transistors 15 and 16, capacitor 48, and resistors 56, 57, 58, 59 and 60. Blocking oscillator 12 consists of transistor 17, magnetic core T1, windings 29, 30, 31 and 32, capacitor 49, zener diode 24, diode 40, and resistors 61, 62, and 78. Output pulse duration control circuit 13 consists of transistors 18, 19, 20, 21, 22 and 23, magnetic core T2, windings 33, 34, 35, 36, 37, 38 and 39, zener diodes 25 and 26, diodes 41, 42, 43, 44, 45, 46 and 47, capacitors 50, 51 and 52, and resistors 63 through 77. Transistors 18, 22 and 23 also function as OR gate 14.

When radiation occurs, a photocurrent is generated within diodes 27 and 28. This photocurrent is supplied to the base of transistor 15. The amplified output at the emitter of transistor 16 is applied to the base of the blocking oscillator transistor 17. The output of the blocking oscillator, taken from winding 31, is applied to the base of transistor 19 and to the base of transistor 18. When transistor 19 is turned on, current begins to flow into the dotted end of winding 33. At this time, the voltage across windng 33 is established by the Zener diode 26 voltage minus the $V_{ce(sat)}$ of transistor 19, $V_f$ of diode 42, and other minor iR drops. The current flowing into the dotted end of winding 33 causes voltage to be induced across the other windings on core T2 which produce current flow out of the dotted ends of all of the other windings of core T2. The current flowing out of winding 34 provides a positive feedback signal to the base transistor 19. The signal to the base is of sufficient magnitude to hold transistor 19 in saturation. The current out of winding 36 drives transistor 22 into saturation. The voltage across winding 36 biases diode 47 off. The current out of winding 37 charges capacitor 52.

Once core T2 is in the set state, transistor 19 loses its positive feedback. The term "set state" as used herein is defined as the direction of magnetization of the core that is established by a current into the dot of winding 33. Current in the opposite direction establishes the reset state. At this time, the current continues to flow through the bias winding 35. This flow of current begins to reset magnetic core T2. The current flowing out of the dotted winding induces a voltage that causes a current to flow into the dotted end of winding 38 and drives the Darlington pair comprising transistors 20 and 21 into saturation. The voltage induced across winding 39 causes a current to flow into the dotted end of the winding. This current holds transistor 23 in saturation which holds the output in the low state. During the period that transistor 19 is turning off and transistors 20 and 21 are turning on, the charge on capacitor 52 supplies base drive to transistor 22. The base drive to transistor 22 from capacitor 52 prevents a transient positive going voltage from appearing at the output at the time that the core T2 saturates in the set state. Once the core saturates in the reset state, transistors 20 and 21 turn off abruptly and the output returns to the high state.

Referring now to FIG. 3, there is indicated thereby the system responses to a single radiation transient 80. Waveform 81 which is actually a representation of the voltage across winding 33 indicates the relative durations of the set and reset times; $xP$ being the set time, $(1-x)P$ being the reset time, and P being the duration or period of output pulse 82. Positive pulse amplitude XE and negative pulse amplitude $(1-X)E$ represent appropriate pulse amplitude values for effecting set and reset states. The radiation detector system conveniently can be designed with a ratio of $xP/P$ in the range of 0.15 to 0.30 and such range of ratios can be extended in either direction by applying appropriate design constraints if required. The examples shown in FIGS. 3–9 have a ratio of $xP/P$ equal to 0.20.

If a second transient occurs before the core T2 is completely saturated in the set state, as illustrated by radiation transient pulse waveform 83 of FIG. 4, the responses of the system (waveforms 84 and 85) will be the same as for a single transient.

If a second transient occurs during the time that the system is in the reset portion of the cycle, transistor 19 will again turn on. The number of ampere-turns in winding 33 when transistor 19 turns on are sufficient to drive all loads presented by each of the other windings and all core losses. Therefore, core T2 is again driven to saturation in the set state. The amount of time required to saturate the core in the set state is a function of that portion of the reset cycle that has been completed before detection of the second transient. The radiation transient pulse waveform 86 of FIG. 5 discloses the second transient occurring when core T2 is one quarter reset. The time required to again saturate the core in the set state is also one quarter of the amount of time required to set the core after it has once been saturated in the reset state, as indicated by waveforms 87 and 88.

Waveforms 90 and 91 of FIG. 6 indicate the system response to two transients as represented by transient waveform 89 in which the second transient occurs just as the system has completed one half of the reset cycle.

Figure 7:
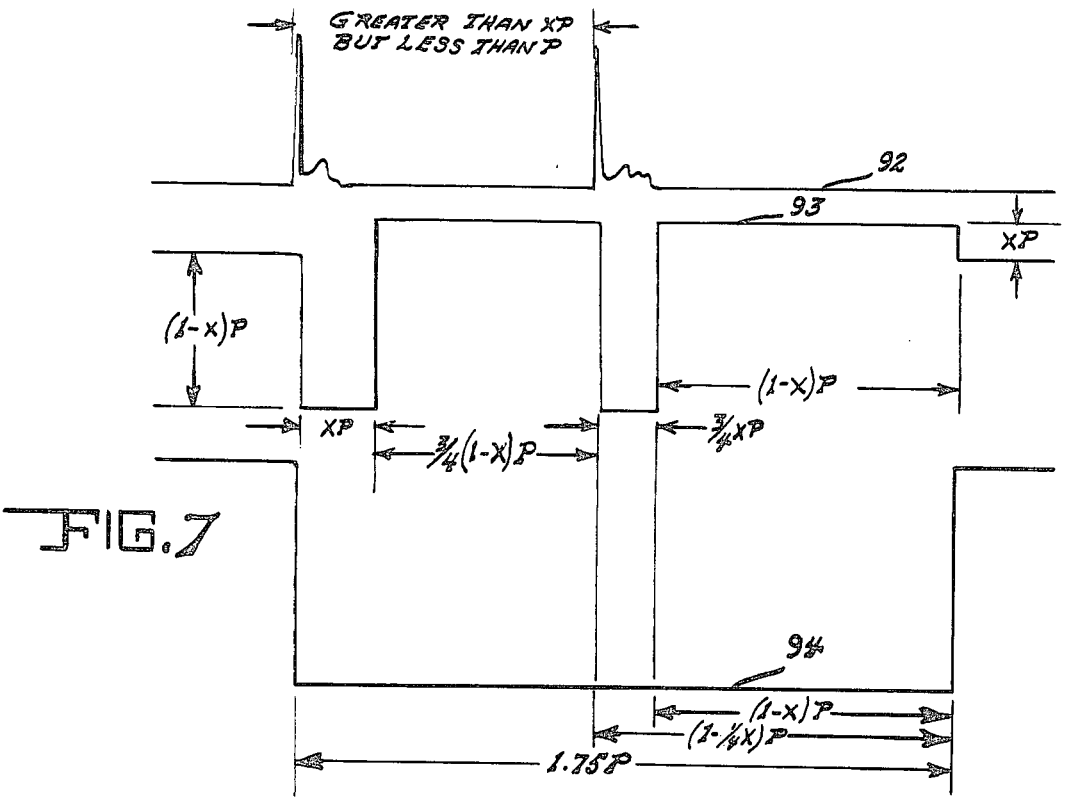
FIG. 7 illustrates a third instance of pulses generated in response to two radiation transients that are spaced at more than the output pulse duration control circuit set time and less than the output pulse period.

Transient waveform 92 and waveforms 93 and 94 of FIG. 7 indicate the system response to two transients occuring such that the second transient begins just as the system has completed three quarters of the reset cycle.

Figure 8:
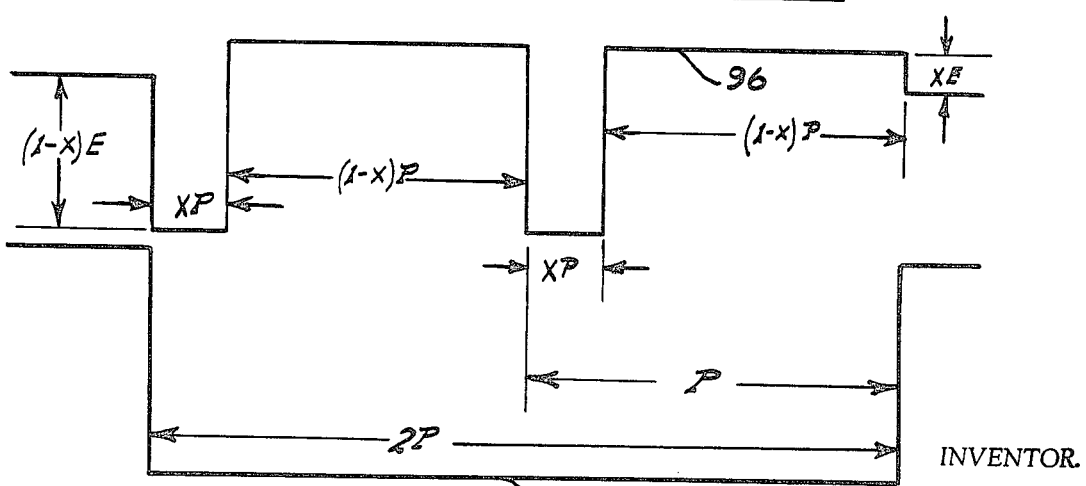
FIG. 8 illustrates pulses generated in response to two radiation transients spaced by the output pulse period.
Figure 9:
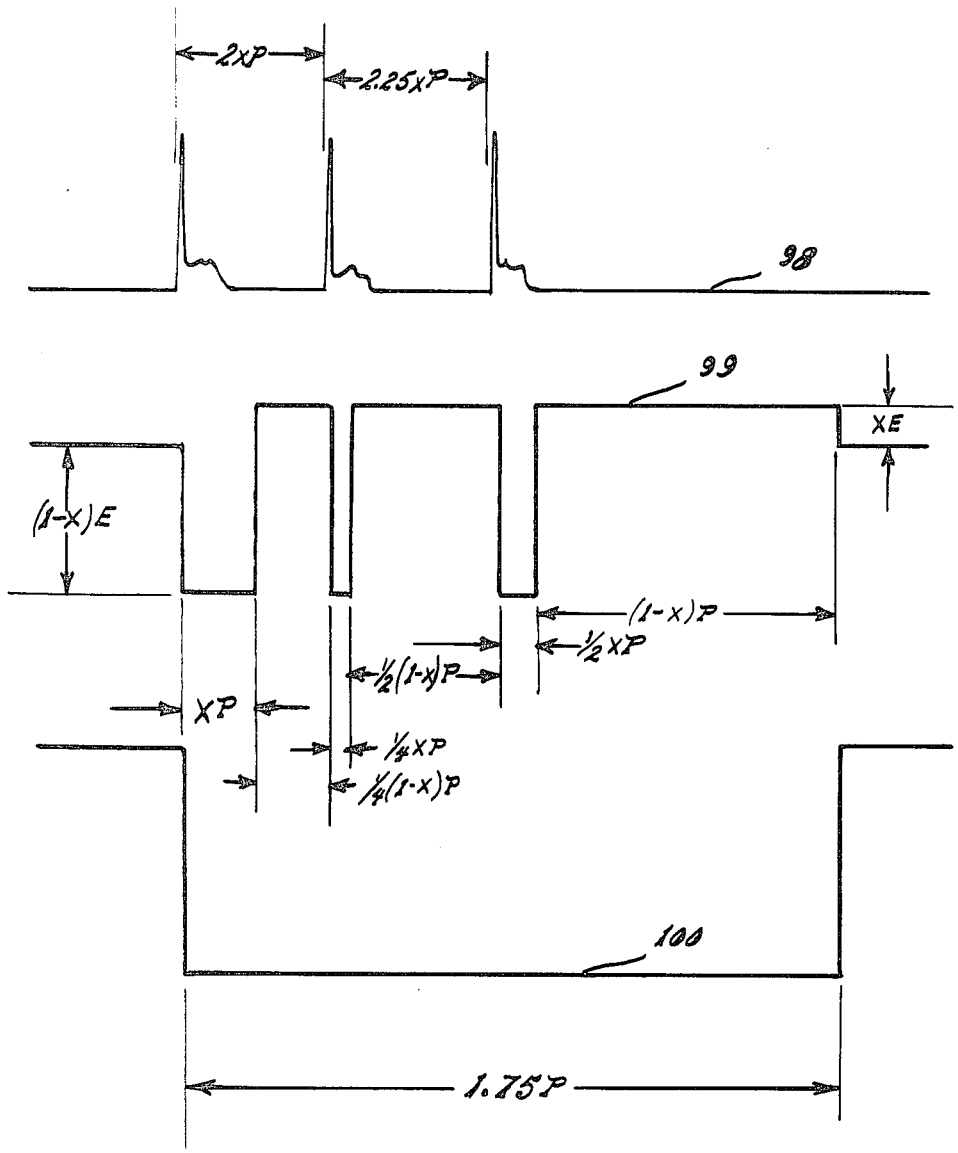
FIG. 9 illustrates pulses generated in response to three radiation transients.

Transient waveform 95 and waveforms 96 and 97 of FIG. 8 indicate the system response to two radiation transients occuring and that the second one begins just before the output starts to rise. If the second transient occurs after the output voltage rises, the response is the same as for two single transients, the response to each being the same as shown in FIG. 3. By observing the response to each of the multiple transient cases shown in FIGS. 4–8, it can be seen that the minimum output period following the second transient is $(1-x)P$ and the maximum P. The amount of time that is added to the $(1-x)P$ period following the second transient is equal to the fraction of the recovery period that has been completed the second transient was sensed, multiplied by $xP$.

The system thus meets the requirements that for any number and any spacing of transients there will always be an output signal present for $(1-x)P$ plus $xP$, or some fraction of $xP$. This is demonstrated by transient waveform 98 and waveforms 99 and 100 of FIG. 9.

While the invention has been described in its preferred embodiment, it is understood that the words which have been used are words of description rather than words of limitation and that changes within the purview of the appended claims may be made without departing from the true scope and spirit of the invention in its broader aspects.

What is claimed is:

1. A radiation detection system comprising radiation sensor means adapted to generate trigger signals in response to radiation transients that exceed a discrete threshold level, a blocking oscillator connected thereto adapted to generate a pulse in response to each said trigger signal, and OR gate, and an output pulse duration control circuit adapted to generate an OR gate actuating signal of given duration in response to each said blocking oscillator pulse, said blocking oscillator being connected to deliver simultaneously pulses generated thereby to a first OR gate input and to said output pulse duration control circuit, said output pulse duration control circuit being connected to a second OR gate input.

2. A radiation detection system as defined in claim 1 wherein said output pulse duration control circuit includes output pulse duration control means comprising a magnetic core, first and second windings thereon, transistor means responsive to each blocking oscillator pulse for permitting current flow through said first winding to effect magnetization of said magnetic core in a given direction, and means for disabling said transistor means upon saturation of said magnetic core, said second winding having a current flow therethrough effective to magnetize said magnetic core to saturation in the opposite direction when said transistor means is disabled.

* * * * *